(12) United States Patent
Kanno

(10) Patent No.: US 9,780,598 B2
(45) Date of Patent: Oct. 3, 2017

(54) POWER-RECEIVING DEVICE, RECEIVING POWER REGULATION METHOD, AND SEMICONDUCTOR DEVICE

(71) Applicant: Dexerials Corporation, Shinagawa-ku, Tokyo (JP)

(72) Inventor: Masayoshi Kanno, Utsunomiya (JP)

(73) Assignee: DEXERIALS CORPORATION, Shinagawa-ku, Tokyo (JP)

( * ) Notice: Subject to any disclaimer, the term of this patent is extended or adjusted under 35 U.S.C. 154(b) by 227 days.

(21) Appl. No.: 14/770,538

(22) PCT Filed: Feb. 7, 2014

(86) PCT No.: PCT/JP2014/052840
§ 371 (c)(1),
(2) Date: Aug. 26, 2015

(87) PCT Pub. No.: WO2014/132773
PCT Pub. Date: Sep. 4, 2014

(65) Prior Publication Data
US 2016/0020634 A1    Jan. 21, 2016

(30) Foreign Application Priority Data

Feb. 27, 2013   (JP) .................................. 2013-037313

(51) Int. Cl.
*H02J 7/02*   (2016.01)
*H02J 17/00*   (2006.01)
(Continued)

(52) U.S. Cl.
CPC ................ *H02J 7/025* (2013.01); *H02J 7/04* (2013.01); *H02J 17/00* (2013.01); *H02J 50/80* (2016.02);
(Continued)

(58) Field of Classification Search
CPC .................................. H02J 17/00; H02J 7/025
(Continued)

(56) References Cited

U.S. PATENT DOCUMENTS 5,311,973 A *  5/1994  Tseng ................... B60L 11/182
                                                            191/10
5,431,264 A *  7/1995  Tseng ................... B60L 11/182
                                                            104/281
(Continued)

FOREIGN PATENT DOCUMENTS

JP   2001-005938 A   1/2001
JP   2010051137 A    3/2010
(Continued)

OTHER PUBLICATIONS

Oct. 14, 2016, the Extended European Search Report issued by the European Patent Office in the corresponding European Patent Application No. 14757114.5.
(Continued)

*Primary Examiner* — Robert Grant
*Assistant Examiner* — John Trischler
(74) *Attorney, Agent, or Firm* — Kenja IP Law PC

(57) ABSTRACT

Provided is a power-receiving device according to at least one embodiment includes: a transmission/reception unit (2) including a resonant circuit having an antenna (2a) configured to receive a power transmitted from a contactless charging device (50) and to transmit and receive data to and from the contactless charging device (50); a charge control unit (5) configured to perform power source control; and a control unit (3) configured to generate control state data indicating a charging state of the secondary cell (6) and/or a power source state of an apparatus main unit (30) operated with the secondary cell (6) and to transmit the control state data to the contactless charging device (50). The control unit
(Continued)

(3) has a power-receiving mode in which normal power supply is performed and a regulation mode in which the received power is regulated by regulating a resonant frequency of the resonant circuit.

17 Claims, 11 Drawing Sheets

(51) Int. Cl.
    *H02J 50/80*         (2016.01)
    *H02J 7/04*          (2006.01)
    *H02J 50/12*         (2016.01)
    *H02J 7/00*          (2006.01)

(52) U.S. Cl.
    CPC ....... *H02J 50/12* (2016.02); *H02J 2007/0096* (2013.01)

(58) Field of Classification Search
    USPC ........................................ 320/108; 307/104
    See application file for complete search history.

(56) References Cited

U.S. PATENT DOCUMENTS

| | | | | |
|---|---|---|---|---|
| 5,963,012 A * | 10/1999 | Garcia | G01R 31/3648 | 320/106 |
| 6,255,635 B1 * | 7/2001 | Thompson | H02M 7/48 | 219/663 |
| 7,181,179 B2 * | 2/2007 | Fujisawa | G04G 21/04 | 455/127.1 |
| 7,518,267 B2 * | 4/2009 | Baarman | H01F 5/02 | 307/150 |
| 8,030,887 B2 * | 10/2011 | Jung | H02J 7/025 | 307/104 |
| 8,111,041 B2 * | 2/2012 | Onishi | H02J 5/005 | 320/106 |
| 8,129,864 B2 * | 3/2012 | Baarman | H02J 5/005 | 307/104 |
| 8,169,185 B2 * | 5/2012 | Partovi | H01F 5/003 | 320/108 |
| 8,307,922 B2 * | 11/2012 | Perlman | B60K 6/46 | 180/2.1 |
| 8,373,386 B2 * | 2/2013 | Baarman | H02J 5/005 | 320/104 |
| 8,395,352 B2 * | 3/2013 | Aoyama | H02J 7/025 | 320/106 |
| 8,531,153 B2 * | 9/2013 | Baarman | H02J 5/005 | 320/108 |
| 8,614,564 B2 * | 12/2013 | Perisic | B60L 11/1811 | 320/138 |
| 8,618,770 B2 * | 12/2013 | Baarman | H02J 5/005 | 307/104 |
| 8,629,654 B2 * | 1/2014 | Partovi | H01F 5/003 | 320/108 |
| 8,638,062 B2 * | 1/2014 | Baarman | H02J 5/005 | 320/108 |
| 8,643,326 B2 * | 2/2014 | Campanella | H01Q 7/00 | 320/108 |
| 8,716,976 B2 * | 5/2014 | Kai | H02J 5/005 | 320/108 |
| 8,803,474 B2 * | 8/2014 | Hillan | G06K 7/0008 | 320/108 |
| 8,901,778 B2 * | 12/2014 | Kesler | H03H 7/40 | 307/104 |
| 8,928,276 B2 * | 1/2015 | Kesler | H02J 17/00 | 307/104 |
| 8,933,594 B2 * | 1/2015 | Kurs | B60L 3/003 | 307/104 |
| 8,947,047 B2 * | 2/2015 | Partovi | H01F 5/003 | 320/108 |
| 8,953,340 B2 * | 2/2015 | Boys | H02J 5/005 | 363/131 |
| 8,963,488 B2 * | 2/2015 | Campanella | H02J 5/005 | 320/108 |
| 9,001,881 B2 * | 4/2015 | Okamura | H04L 25/02 | 375/238 |
| 9,041,254 B2 * | 5/2015 | Lisuwandi | H02J 5/005 | 307/104 |
| 9,112,367 B2 * | 8/2015 | Kim | H02J 5/005 | |
| 9,257,851 B2 * | 2/2016 | Baarman | H02J 5/005 | |
| 9,270,138 B2 * | 2/2016 | Yamakawa | H01M 10/44 | |
| 9,276,437 B2 * | 3/2016 | Partovi | H01F 5/003 | |
| 9,391,476 B2 * | 7/2016 | Kamata | H02J 5/005 | |
| 9,531,441 B2 * | 12/2016 | Bae | H02M 7/06 | |
| 9,531,444 B2 * | 12/2016 | Bae | H02M 7/06 | |
| 9,537,539 B2 * | 1/2017 | Bae | H02M 7/06 | |
| 9,577,715 B2 * | 2/2017 | Taguchi | H01M 10/46 | |
| 9,601,943 B2 * | 3/2017 | Partovi | H01F 5/003 | |
| 9,647,480 B2 * | 5/2017 | Bae | H02J 7/025 | |
| 2004/0145342 A1 * | 7/2004 | Lyon | H02J 7/025 | 320/108 |
| 2008/0197802 A1 * | 8/2008 | Onishi | H02J 5/005 | 320/106 |
| 2009/0096413 A1 * | 4/2009 | Partovi | H01F 5/003 | 320/108 |
| 2009/0129126 A1 * | 5/2009 | Boys | H02J 5/005 | 363/37 |
| 2009/0174263 A1 | 7/2009 | Baarman et al. | | |
| 2009/0284218 A1 * | 11/2009 | Mohammadian | G06K 7/0008 | 320/107 |
| 2009/0284220 A1 * | 11/2009 | Toncich | G06K 7/0008 | 320/108 |
| 2009/0284227 A1 * | 11/2009 | Mohammadian | G06K 7/0008 | 320/137 |
| 2010/0007307 A1 * | 1/2010 | Baarman | H02J 5/005 | 320/108 |
| 2010/0171461 A1 * | 7/2010 | Baarman | H02J 5/005 | 320/108 |
| 2010/0224725 A1 * | 9/2010 | Perlman | B60K 6/46 | 244/1 R |
| 2011/0273138 A1 * | 11/2011 | Baarman | H02J 5/005 | 320/108 |
| 2012/0032522 A1 * | 2/2012 | Schatz | A61N 1/3975 | 307/104 |
| 2012/0056580 A1 * | 3/2012 | Kai | H02J 5/005 | 320/108 |
| 2012/0062039 A1 * | 3/2012 | Kamata | H02J 5/005 | 307/104 |
| 2012/0098351 A1 * | 4/2012 | Ross | A61B 18/1233 | 307/104 |
| 2012/0112691 A1 * | 5/2012 | Kurs | B60L 11/182 | 320/108 |
| 2012/0119588 A1 * | 5/2012 | Baarman | H02J 5/005 | 307/104 |
| 2012/0119698 A1 * | 5/2012 | Karalis | B60L 11/182 | 320/108 |
| 2012/0126755 A1 * | 5/2012 | Perisic | B60L 11/1811 | 320/145 |
| 2012/0235634 A1 * | 9/2012 | Hall | H03H 7/40 | 320/108 |
| 2012/0256585 A1 * | 10/2012 | Partovi | H01F 5/003 | 320/108 |
| 2012/0306262 A1 * | 12/2012 | Taguchi | B60L 3/00 | 307/9.1 |
| 2013/0026847 A1 | 1/2013 | Kim et al. | | |
| 2013/0033235 A1 * | 2/2013 | Fukaya | H02J 17/00 | 320/162 |
| 2013/0154373 A1 * | 6/2013 | Lisuwandi | H02J 5/005 | 307/34 |
| 2013/0175983 A1 * | 7/2013 | Partovi | H01F 5/003 | 320/108 |
| 2013/0187598 A1 * | 7/2013 | Park | H02J 7/0042 | 320/108 |
| 2013/0214611 A1 * | 8/2013 | Bae | H02M 7/06 | 307/104 |
| 2013/0234528 A1 * | 9/2013 | Kargl | H02J 5/005 | 307/104 |

(56) References Cited

U.S. PATENT DOCUMENTS

| | | | | |
|---|---|---|---|---|
| 2014/0015478 A1* | 1/2014 | Von Novak | ........... | H02J 7/0004 320/108 |
| 2014/0103870 A1* | 4/2014 | Baarman | ................ | H02J 5/005 320/108 |
| 2014/0175897 A1* | 6/2014 | Taguchi | ................ | H01M 10/46 307/104 |
| 2014/0203658 A1* | 7/2014 | Taguchi | ................ | H01M 10/46 307/104 |
| 2014/0203774 A1* | 7/2014 | Sawayanagi | ........... | H02J 7/0004 320/108 |
| 2014/0210277 A1* | 7/2014 | Ben-Shalom | ........... | H02J 5/005 307/104 |
| 2015/0008755 A1* | 1/2015 | Sone | ....................... | H02J 7/025 307/104 |
| 2015/0008760 A1* | 1/2015 | Bae | ......................... | H02M 7/06 307/104 |
| 2015/0022149 A1* | 1/2015 | Bae | ......................... | H02M 7/06 320/108 |
| 2015/0054456 A1* | 2/2015 | Yamakawa | ........... | B60L 11/182 320/108 |
| 2015/0061580 A1* | 3/2015 | Yamakawa | ........... | H01M 10/44 320/108 |
| 2015/0077048 A1* | 3/2015 | Bae | ......................... | H02J 7/025 320/108 |
| 2015/0091523 A1* | 4/2015 | Satyamoorthy | ......... | H02J 7/025 320/108 |
| 2015/0145475 A1* | 5/2015 | Partovi | .................... | H01F 5/003 320/108 |
| 2016/0020634 A1* | 1/2016 | Kanno | .................... | H02J 17/00 320/108 |
| 2016/0134134 A1* | 5/2016 | Baarman | ................ | H02J 5/005 307/104 |
| 2016/0181860 A1* | 6/2016 | Partovi | .................... | H01F 5/003 320/108 |
| 2016/0301254 A1* | 10/2016 | Kamata | ................... | H02J 5/005 |
| 2017/0104373 A1* | 4/2017 | Bae | ......................... | H02J 50/12 |

FOREIGN PATENT DOCUMENTS

| | | |
|---|---|---|
| JP | 2011-120410 A | 6/2011 |
| JP | 2011-166883 A | 8/2011 |
| JP | 2012-060731 A | 3/2012 |
| JP | 2012-514971 A | 6/2012 |

OTHER PUBLICATIONS

Mar. 18, 2014 International Search Report issued in International Patent Application No. PCT/JP2014/052840.

* cited by examiner

POWER-RECEIVING DEVICE, RECEIVING POWER REGULATION METHOD, AND SEMICONDUCTOR DEVICE

TECHNICAL FIELD

The present disclosure relates to a power-receiving device (hereinafter, may be called a power receiver) configured to receive power transmitted from a contactless charging device (hereinafter, may be called a contactless power transmitter), a received power regulation method, a received power regulation program, and a semiconductor device. The present disclosure is based on and claims the priority of Japanese Patent Application No. 2013037313 filed in Japan on Feb. 27, 2013, which is herein incorporated by reference.

BACKGROUND

Conventionally, rechargeable electric appliances, such as an electric toothbrush and an electric shaver, that are used mainly in wet areas have adopted contactless chargers to avoid exposure of connection electrodes provided for connection between the chargers and the electric appliances. Due to safety concerns, the use of such a contactless charger has recently expanded to a domestic game machine, a cordless phone, a mobile phone, and others. Generally speaking, there is a one-to-one correspondence between chargers and the electric appliances, and different electric appliances require dedicated chargers.

Incidentally, portable terminal devices, such as a mobile phone and a smartphone, are facing the problem of how to secure the power sources while their demands are dramatically increasing. These portable terminal devices also secure the power sources by using dedicated chargers or AC adaptors. However, assuming that one wishes to secure the power sources when operating the portable terminals away from home without carrying dedicated chargers or AC adaptors, it is necessary to prepare different chargers or adaptors for different portable terminal devices. This requires a great number of chargers or adaptors and is unfeasible. Adopting contactless charging method provides an advantageous effect of allowing flexible power source connection that has nothing to do with specifications of power source connection terminals. This has driven the need for normalization and standardization of charging methods between charging devices and portable terminal devices.

As an example, the Wireless Power Consortium (WPC) has released the standard contactless charging method called Qi (pronounced "chee") targeted mainly for portable terminal apparatuses, thus enabling charging between any Qi-compliant chargers and portable terminal devices.

The contactless charging method, including the Qi standard, involves power transfer through inductive coupling or magnetic resonance between a primary antenna included in a charging device and a secondary antenna included in a power-receiving device.

A contactless charging system (hereinafter, may be called a contactless power system) as such includes resonant circuits configured by connecting a resonant capacitor to each of the primary antenna and the secondary antenna for the purpose of contactless power transfer and data communication between the charging device and the power-receiving device. Regulating the resonant frequency of the resonant circuit on the primary side and that on the secondary side allows stable and efficient power transfer and data communication between the charging device and the power-receiving device.

In this regard, the inductance L of each antenna and the capacitance C of each resonant capacitor are subject to several variable factors and are not always predictable. For example, the characteristics of the inductance L change depending on variation in characteristics of a magnetic core used in the antenna and on an ambient temperature. The capacitance C of the resonant capacitor also changes depending on initial variation, temperature characteristics, and voltage dependency. Furthermore, a mutual inductance M of the primary and the secondary antenna changes depending on a clearance and relative positioning between the primary and the secondary antenna, and since the charging device is physically distant from the power-receiving device, it is difficult to maintain fixed relative positions with respect to each other.

When the resonant frequency is shifted due to the aforementioned various factors, power transfer efficiency is deteriorated, and the problem of heating manifests itself. This prevents miniaturization and reduction in power consumption of the device. A significant deterioration in transfer efficiency might also cause even a system problem such as prolonged charging time and a timeout in charging.

Accordingly, the big challenge is to regulate the resonant frequency on each of the primary and the secondary side to an optimal value.

CITATION LIST

Patent Literature

PTL 1: JP2001005938A

SUMMARY

Technical Problems

Patent Literature 1 discloses a technique of regulating, in an IC card that is capable of contactless communicating with a reader/writer, the resonant frequency of the IC card so that the amplitude of a received signal from the reader/writer is maximized.

However, when applied to a contactless charging system, such a technique poses a problem of difficulty in detecting the maximum voltage when a transmitted power changes.

For example, a contactless charging system complying with the Qi standard or the like uses a method of controlling an output power from a power transmitter to regulate a power received by a power receiver to be a desired value, as similarly used in a common power control method. The power transmitter and the power receiver are, however, physically distant, and accordingly, the power receiver provides a feedback to the power transmitter by transmitting wireless communication data.

In the Qi standard, the power receiver transmits, as a control error signal, a difference between a power desired by the power receiver and a power that has been transmitted to the power transmitter. The charging device performs control toward zero difference. Such communication is conducted intermittently. Accordingly, when, as in the technique disclosed in Patent Literature 1, the resonant frequency is regulated to maximize the received voltage without reference to control performed by the power transmitter, a load voltage and a load current are inevitably affected, and thus bringing about a change in the control error signal. This causes the power transmitter to change the power to be transmitted in order to cancel out the change in the control error signal, possibly resulting in a hunting phenomenon characterized by fluctuations in control.

One way to prevent unstable operation such as the hunting phenomenon is to cause the power transmitter and the power receiver to perform cooperative control. However, this requires a large-scale system and also poses the problem of difficulty in maintaining compatibility with the already established standards such as Qi.

Furthermore, in the power receiver, an apparatus main unit is sometimes operated while a secondary battery is controlled to be charged. In this situation, a change in the load current due to an inconstant operation current of the apparatus main unit might cause a change in the received voltage. This causes another problem of difficulty in optimally regulating the resonant frequency.

In view of the above, the present disclosure is to provide a power-receiving device, a received power regulation method, a received power regulation program, and a semiconductor device all of which are capable of optimizing a received power by regulating a resonant frequency independently from a power transmitter to avoid conflict by output control performed by the power transmitter.

Solution to Problems

In one aspect for solving the aforementioned problems, at least one embodiment of the present disclosure provides a power-receiving device, including: a transmission/reception unit including a resonant circuit having an antenna configured to receive a power transmitted from a contactless power transmitter and configured to transmit and receive data to and from the contactless charging device; a charge control unit configured to perform power source control, including charging of a secondary cell, by using the power received by the transmission/reception unit; and a control unit configured to generate control state data indicating a charging state of the secondary cell and/or a control state of a power source of an apparatus main unit operated with the secondary cell and configured to transmit the generated control state data to the contactless charging device through the transmission/reception unit. The control unit has: a power-receiving mode in which the power transmitted based on the control state data is used for charging of the secondary cell through the charge control unit and/or for the power source of the apparatus main unit operated with the secondary cell; and a regulation mode in which the received power is regulated by setting the control state data to a predetermined constant value and regulating a resonant frequency of the resonant circuit.

In another aspect, at least one embodiment of the present disclosure provides a received power regulation method of regulating a power received by a power-receiving device for contactless charging, the received power regulation method including: a power-receiving mode; and a regulation mode. The power-receiving mode includes: the step, performed by a transmission/reception unit, of receiving the power or data transmitted from a contactless charging device; the step, performed by a charge control unit, of performing power source control, including charging of a secondary cell, by using the power received by the transmission/reception unit; and the step, performed by a control unit, of generating control state data indicating a charging state of the secondary cell and/or a control state of a power source of an apparatus main unit operated with the secondary cell, transmitting the generated control state data to the contactless charging device through the transmission/reception unit, and supplying a power transmitted based on the control state data to the secondary cell through the charge control unit and/or to the power source of the apparatus main unit operated with the secondary cell. The regulation mode includes: the step, performed by the control unit, of setting the control state data to a predetermined constant value, transmitting the control state data to the contactless charging device through the transmission/reception unit, and supplying a power transmitted based on the control state data to the secondary cell through the charge control unit and/or to the power source of the apparatus main unit operated with the secondary cell, wherein the control unit regulates the received power by regulating a resonant frequency of a resonant circuit included in the transmission/reception unit.

In yet another aspect, at least one embodiment of the present disclosure provides a received power regulation program of a power-receiving device for contactless charging that includes a storage unit storing the program and a control unit having a processing unit configured to load and execute the stored program. The received power regulation program includes a power-receiving mode in which a power is received from a contactless charging device. The power-receiving mode includes: the step, performed by a transmission/reception unit, of receiving the power or data transmitted from the contactless charging device; the step, performed by a charge control unit, of performing power source control, including charging of a secondary cell, by using the power received by the transmission/reception unit; and the step, performed by a control unit, of generating control state data indicating a charging state of the secondary cell and/or a control state of a power source of an apparatus main unit operated with the secondary cell, transmitting the generated control state data to the contactless charging device through the transmission/reception unit, and supplying the power transmitted based on the control state data to the secondary cell through the charge control unit and/or to a power source for the apparatus main unit operated with the secondary cell. The received power regulation program also includes a regulation mode in which the received power is regulated. The regulation mode includes: the step, performed by the control unit, of setting the control state data to a predetermined constant value, transmitting the control state data to the contactless charging device through the transmission/reception unit, and supplying a power transmitted based on the control state data to the secondary cell through the charge control unit and/or to the power source of the apparatus main unit operated with the secondary cell, wherein the control unit regulates the received power by regulating a resonant frequency of a resonant circuit included in the transmission/reception unit.

In yet another aspect, at least one embodiment of the present disclosure provides a semiconductor device including a storage unit storing the received power regulation program.

The semiconductor device according to another embodiment of the present disclosure may further include a control unit configured to load and execute the received power regulation program.

Advantageous Effect

Since the present disclosure includes the regulation mode in which the received power is optimized by regulating the resonant frequency of the power-receiving device, in addition to the power-receiving mode in which an output is regulated, the received power is optimized by regulating the resonant frequency of the power receiver while the received power unstable operation such as the hunting phenomenon is prevented.

DETAILED DESCRIPTION

Preferred embodiments according to the present disclosure will be described in detail below with reference to the drawings. However, the present disclosure is not limited to the following embodiments. Needless to say, various changes may be made to the embodiments without departing from the gist of the present disclosure. The description is given in the following order.

Figure 1:
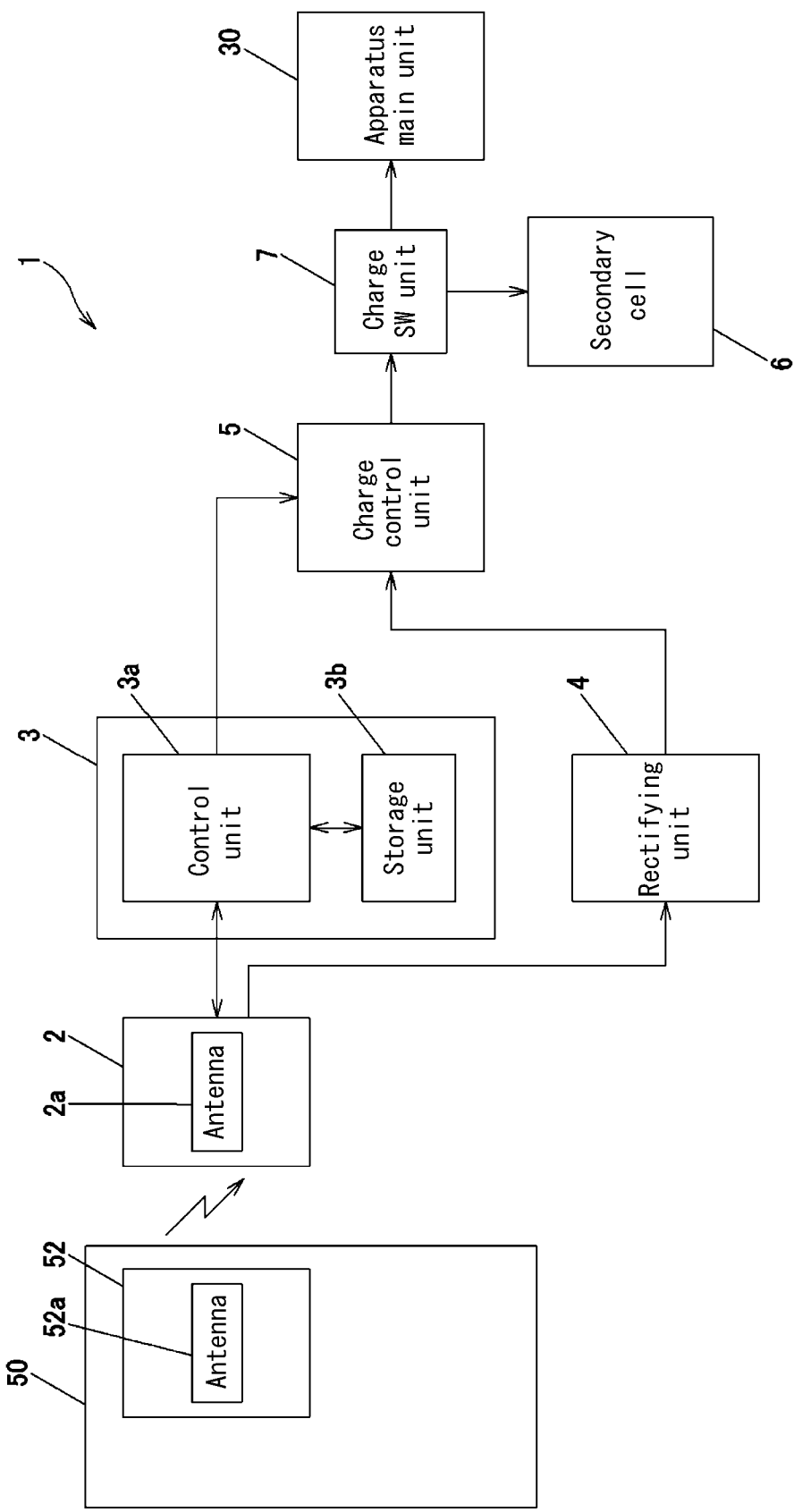
FIG. 1 is a block diagram illustrating an exemplary configuration of a power-receiving device according to at least one embodiment of the present disclosure.

1. Exemplary Configuration of Power-Receiving Device
2. Principle of Operation and Operation of Power-Receiving Device
   2-1. Regulation of Resonant Frequency
   2-2. Power-receiving mode and Regulation Mode Settings
   2-3. Load Power Setting
3. Received Power Regulation Method
4. Modifications 1. Exemplary Configuration of Power-Receiving Device As illustrated in FIG. 1, a power-receiving device 1 according to at least one embodiment of the present disclosure includes a transmission/reception unit 2 including a secondary antenna 2a configured to electromagnetically couple to a primary antenna 52a included in a transmission/reception unit 52 of a contactless charging device 50. The power-receiving device 1 also includes a control system unit 3 that is connected to the transmission/reception unit 2 and that is configured to demodulate received data and control the power-receiving device 1 based on the demodulated data. The power-receiving device 1 also includes a rectifying unit 4 that is connected to the transmission/reception unit 2 and that is configured to rectify the received alternate current power, and a charge control unit 5 configured to control the direct current power rectified by the rectifying unit 4 in accordance with an instruction from the control system unit 3 to control load power. The power-receiving device 1 also includes a secondary cell 6 that is connected through a charge SW unit 7 and an apparatus main unit 30 that may be operated with the secondary cell 6.

The transmission/reception unit 2 includes a resonant circuit that includes the secondary antenna 2a and that is capable of regulating the resonant frequency based on an external signal. The primary antenna 52a may couple to the secondary antenna 2a by electromagnetic induction, magnetic resonance, or any other magnetic connection.

The control system unit 3 includes a storage unit 3b storing a program describing an operation procedure of the power-receiving device 1 and a control unit 3a configured to control operation of the power-receiving device 1 in accordance with the procedure stored in the storage unit 3b. The control unit 3a is, for example, a Central Processing Unit (CPU) or a microcontroller. The storage unit 3b may be a mask ROM, an EPROM, an EEPROM, or the like built into a microcontroller. These examples are not meant to exclude other forms of the control system unit 3.

The charge control unit 5 controls charging of the secondary cell 6 in response to supply of the direct current power from the rectifying unit 4. When, for example, the secondary cell 6 is a lithium ion secondary cell, the charge control unit 5 may control switching of constant current charging/constant voltage charging or may detect completion of charging. In response to supply of the direct current power from the rectifying unit 4, the charge control unit 5 also supplies operating power for a predetermined block in the control system unit 3.

The charge SW unit 7 supplies power to the secondary cell 6 and the apparatus main unit 30 in accordance with an instruction from the charge control unit 5. However, under a predetermined condition described later below, the charge SW unit 7 may supply power only to the secondary cell 6, and the apparatus main unit 30 may be supplied with power from the secondary cell 6 alone.

Examples of the apparatus main unit 30 include a portable terminal device, such as a mobile phone, a smart phone, and a notebook PC, that is operated mainly with the secondary cell.

Figure 2:
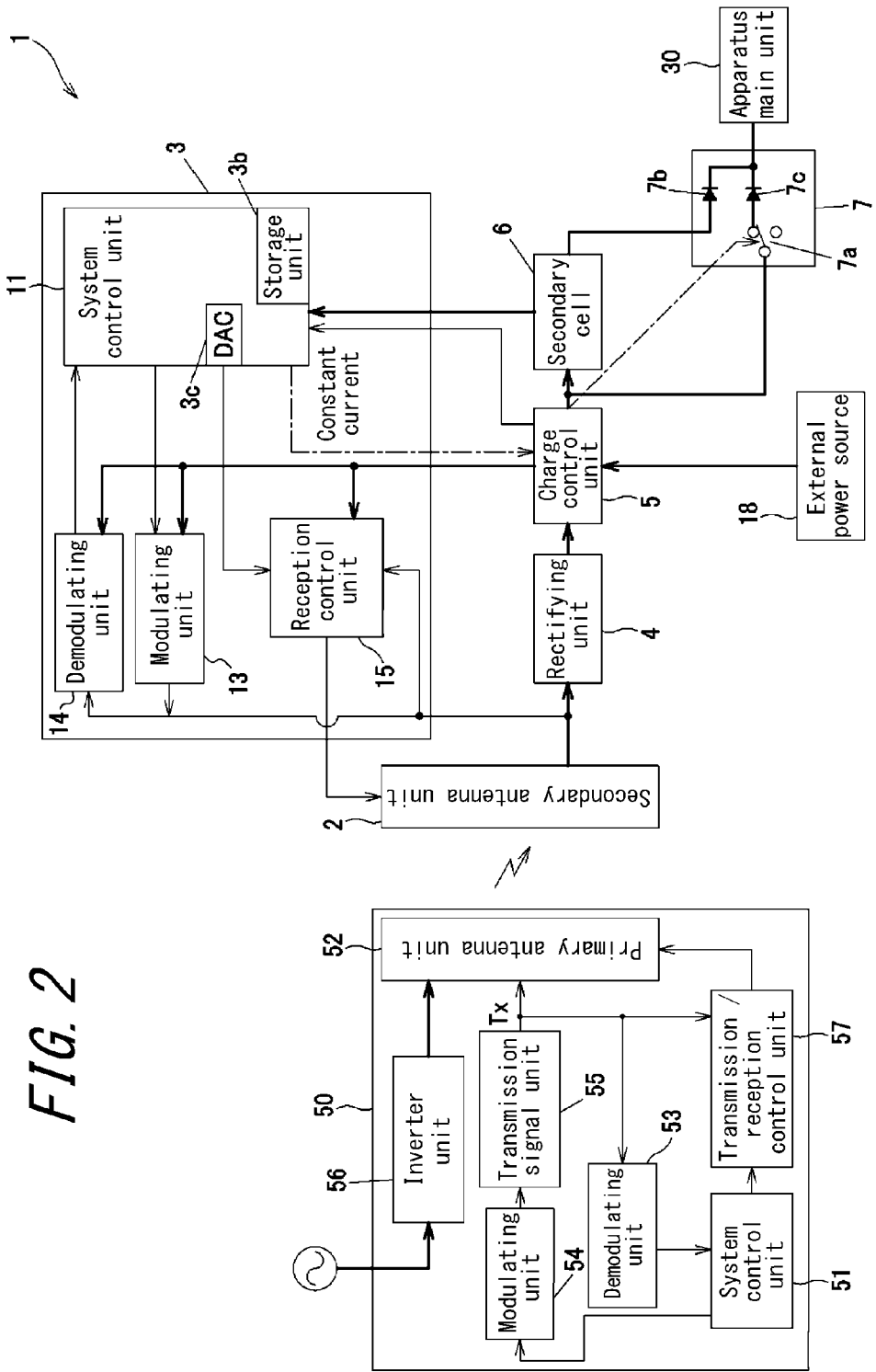
FIG. 2 is a block diagram illustrating a more detailed exemplary configuration of a power-receiving device according to at least one embodiment of the present disclosure.

FIG. 2 illustrates a more detailed configuration of the power-receiving device 1. In FIG. 2, a thick line represents a power supply path, and a thin line represents a transmission/reception path of data/signals. Furthermore, an alternate long and short dash line represents a transmission/reception path of signals that is characteristic of the present embodiment.

The power-receiving device 1 includes the control system unit 3 configured to receive data from the transmission/reception unit 2 and perform data communication with the contactless charging device 50 from which power is transmitted.

In further detail, the control system unit 3 includes a demodulating unit 14 configured to demodulate modulated signals received from the transmission/reception unit 2 and a system control unit 11 configured to analyze data resulting from the demodulation of the demodulating unit 14 and send a predetermined instruction to each block. The control system unit 3 also includes a modulating unit 13 configured to modulate control state data, which is generated in the system control unit 11 and which indicates a load state of the power-receiving device 1 that is to be transmitted to the contactless charging device 50, to transmit the modulated control state data to the contactless charging device 50. The control system unit 3 also includes a reception control unit 15 configured to generate a control signal for regulating the resonant frequency of the transmission/reception unit 2 in accordance with an instruction from the system control unit 11. In a regulation mode in which the resonant frequency of the power-receiving device 1 is regulated, the system control unit 11 instructs the charge control unit 5 to maintain a constant power in order to maintain load power to be constant.

The system control unit 11 corresponds to the main part of the control unit 3 of FIG. 1 and may be configured by a processer such as a CPU. Although the system control unit 11 preferably includes the storage unit 3b storing the program describing the operation procedure, a memory device, such as a ROM, that is added externally to the system control unit 11 may also be used. The system control unit 11 also includes a Digital Analog Converter (DAC) 3c configured to generate control voltage for the control signal of the resonant frequency of the transmission/reception unit 2 through the reception control unit 15.

The demodulating unit 14, the modulating unit 13, and the reception control unit 15 are configured to operate by using smoothed direct current power that has been rectified by the rectifying unit 4 after being received from the contactless charging device 50. Since the system control unit 11 needs to operate even under absence of transmitted power, power is supplied to the system control unit 11 from the secondary cell 6 that is to be charged in the power-receiving device 1.

The charge control unit 5 supplies power to the demodulating unit 14, the modulating unit 13, and the reception control unit 15 included in the control system unit 3, controls charging of the secondary cell 6, and supplies direct current power to the apparatus main unit 30 through the charge SW unit 7, by using direct current power that has been rectified by the rectifying unit 4. The charge control unit 5 may operate with the supplied power and may also operate with an external power source 18, such as an AC adaptor, that may be connected thereto.

The charge SW unit 7 includes a diode 7b that is inserted in series in a power supply path from the secondary cell 6 to the apparatus main unit 30 and a diode 7c that is inserted in series in a power supply path from an input of the charge control unit 5 to the apparatus main unit 30. Furthermore, a SW 7a is inserted in series in the diode 7c, and in the regulation mode, the path is disconnected in response to a signal outputted by the charge control unit 5 in accordance with an instruction from the system control unit 11.

As illustrated in FIG. 2, the contactless charging device 50 includes an inverter unit 56 configured to supply transmitted power to the transmission/reception unit 52. The inverter unit 56 receives an input from a commercial alternate current power source, a solar power output, or the like and drives a resonant circuit of the transmission/reception unit 52 at a predetermined oscillating frequency. For data transmission and reception, the contactless charging device 50 includes a modulating unit 54 configured to modulate data at a predetermined frequency, the data having been generated by the system control unit 51 and being to be communicated through the transmission/reception unit 52. The contactless charging device 50 also includes a transmission signal unit 55 for operating the primary antenna 52a by using a modulated signal modulated by the modulating unit. The contactless charging device 50 also includes a demodulating unit 53 configured to demodulate a signal received by the transmission/reception unit 52 and a transmission/reception control unit 57 configured to generate a regulation signal for regulating the resonant frequency of the resonant circuit including the primary antenna 52a based on the received signal. Additionally, although in the contactless charging device 50 the resonant frequency of the transmission/reception unit 52 may also be regulated to maximize transmitted power independently from the power receiver as described above, a detailed description is omitted herein because this is not relevant to the scope of the present disclosure.

Figure 3A:
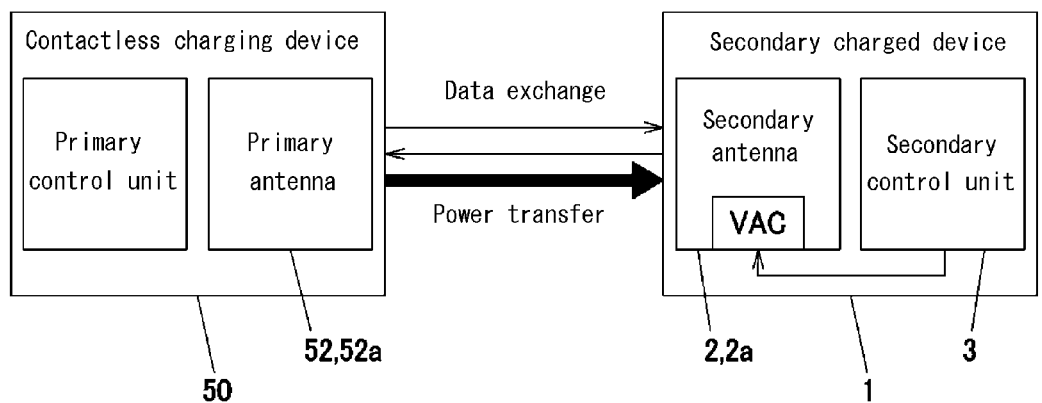
FIG. 3A is a block diagram illustrating a principle of operation of a power-receiving device according to the present disclosure.

2. Principle of Operation and Operation of Power-Receiving Device 2-1. Regulation of Resonant Frequency As illustrated in FIG. 3A, in a contactless charging system complying with the Qi standard or the like, the contactless charging device 50 on the primary side transmits transmitted power and data which have been generated by the primary control unit to the power-receiving device on the secondary side through the primary antenna 52a. The power-receiving device 1 receives the transmitted power and data by the secondary antenna 2a, and the received power and data is converted to power for charging the secondary cell by the secondary control unit 3. The secondary control unit 3 also generates a feedback signal. The feedback signal generated by the secondary control unit 3 is transmitted through the secondary antenna to the contactless charging device as control data used for power source control. Additionally, according to the Qi standard, data communication may be used also for sensing the location of the power-receiving device 1 and validating the power-receiving device 1.

The resonant circuit of the power-receiving device 1 includes the secondary antenna 2a and a variable capacitance capacitor VAC. To optimize power transmitted from the contactless charging device, the power-receiving device 1 regulates the resonant frequency by changing a direct current bias voltage applied to the variable capacitance capacitor VAC by the secondary control unit.

Figure 3B:
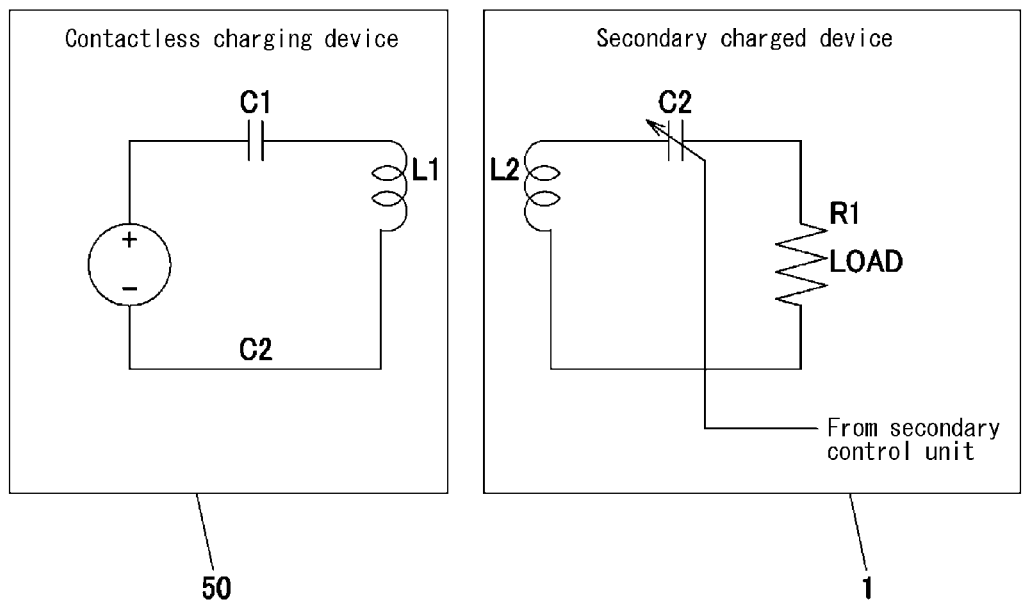
FIG. 3B is a circuit diagram of resonant circuits as main parts of a contactless charging device and a power-receiving device.

In further detail, as illustrated in FIG. 3B, the control unit of the contactless charging device 50 on the primary side excites the resonant circuit that, for example, oscillates at a sine wave of 120 kHz and has an inductance L1 and a capacitance C1. The current of a sine wave at 120 kHz generates a magnetic field due to the inductance L1. The generated magnetic field couples to the antenna 2a including an inductance L2 of the power-receiving device 1 and excites the resonant circuit including the inductance L2 and a capacitance C2.

As described earlier, efficient power transfer is achieved if a favorable coupling between the primary antenna and the secondary antenna is obtained when the resonant frequency f1 of the resonant circuit having the inductance L1 and the capacitance C1 is equal to the resonant frequency f2 of the resonant circuit including the inductance L2 and the capacitance C2. In practice, the inductance L2 of the secondary antenna changes by at least ±2% to ±5% depending on the quality, such as an initial variation in magnetic characteristics, including magnetic permeability, and temperature characteristics, of material, such as a ferrite core, of a magnetic core that is used in the antenna. Furthermore, a mutual inductance M of the primary and the secondary antenna changes in proportion to the product of the inductances L1 and L2 and a coupling coefficient associated with a clearance and relative positioning between the antennas.

$$M = k \cdot (L1 \times L2)^{0.5}$$

To improve power transfer efficiency, the coupling coefficient k needs to be increased. However, it is difficult to regulate the resonant frequency simply by physical positioning. Moreover, such initial variation and temperature characteristics are also found in the capacitance C2 of the resonant capacitor. When a ferroelectric capacitor is used as the resonant capacitor, a change by approximately ±10% needs to be expected as the temperature characteristics. To improve transfer efficiency of the secondary antenna 2a, the Q factor of the resonant circuit on the secondary side needs to be increased. However, it is difficult to increase the Q significantly in consideration of the variation in each component. Besides, as illustrated in FIG. 3B, the load condition in the power-receiving device 1 on the secondary side is subject to a change. When the load condition is represented by a resistance R, the Q factor of the resonant circuit including L2, C2, and R depends on the load condition, and accordingly, an increase in the Q would not greatly improve the efficiency.

Accordingly, to regulate the resonant frequency, the resistance R, i.e., load power, needs to be fixed, and the resonant frequency needs to be changed by using a variable capacitance capacitor.

Figure 4A:
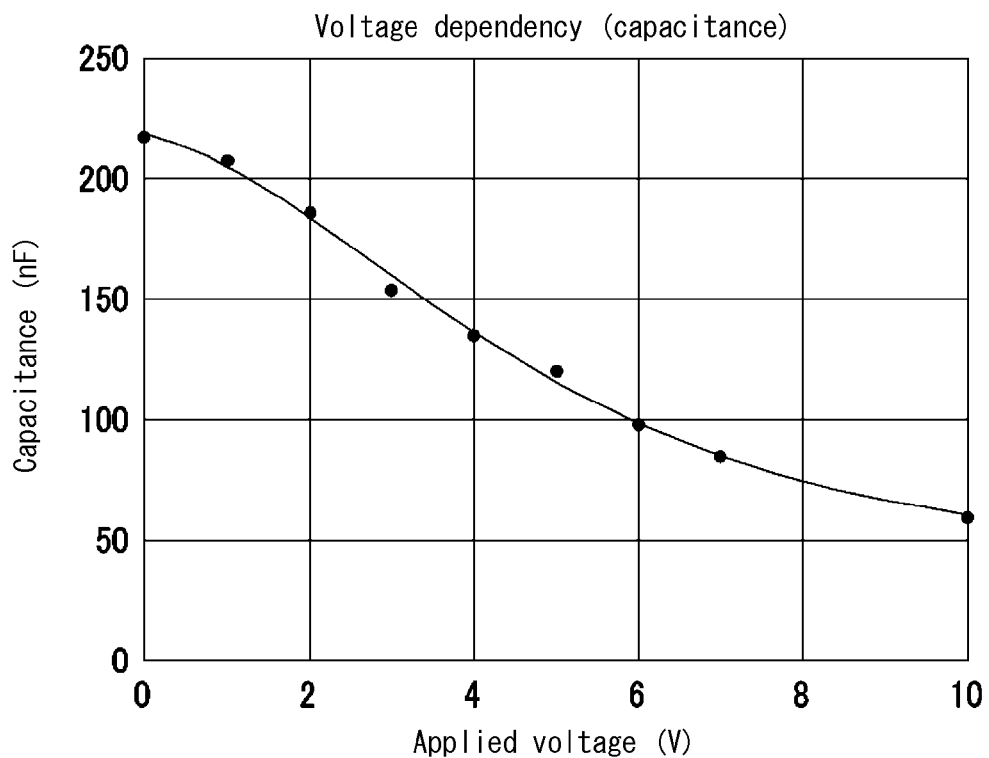
FIG. 4A is a graph illustrating exemplary direct current bias dependency of a capacitance of a variable capacitance capacitor.

FIG. 4A illustrates voltage dependency of a capacitance value of a variable capacitance capacitor using a ferroelectric. The variable capacitance capacitor is a device whose capacitance value may be changed in response to a direct current bias voltage applied across the electrodes. As illustrated in FIG. 4A, the capacitance value is approximately 220 nF in an unbiased state, and the capacitance value decreases to approximately 120 nF in response to a direct current bias of 5V. Accordingly, the capacitance value may be changed at a change rate of approximately −20 nF/V.

Figure 4B:
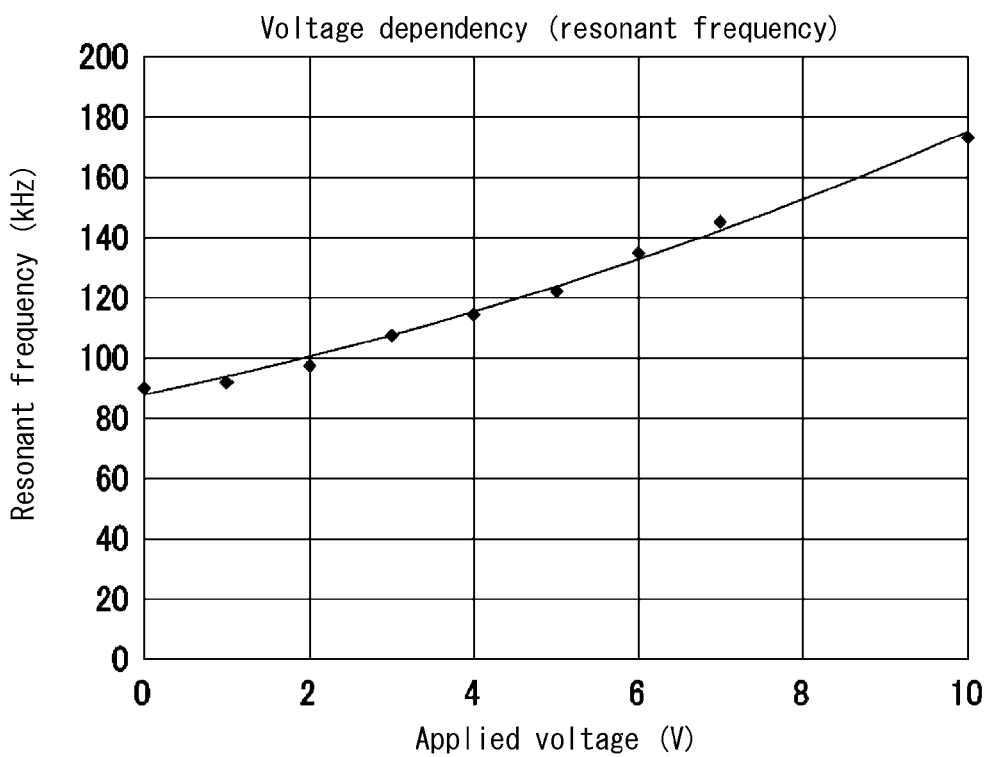
FIG. 4B is a graph illustrating exemplary direct current bias dependency of a resonant frequency of a resonant circuit using the variable capacitance capacitor of FIG. 4A.

By using the variable capacitance capacitor in the resonant circuit, as illustrated in FIG. 4B, the resonant frequency may be changed from 90 kHz in an unbiased state to approximately 120 kHz in response to application of a voltage of 5V (+6 kHz/V=+6.7%/V).

By measuring the received voltage and current by thus regulating the resonant frequency by using the variable capacitance capacitor in the resonant circuit of the power-receiving device 1 on the secondary side, the maximum value of received power may be tracked.

2-2. Power-Receiving Mode and Regulation Mode Settings

Meanwhile, standards such as Qi do not enable a certain specification added to a system to affect specifications of the entire system.

Figure 5:
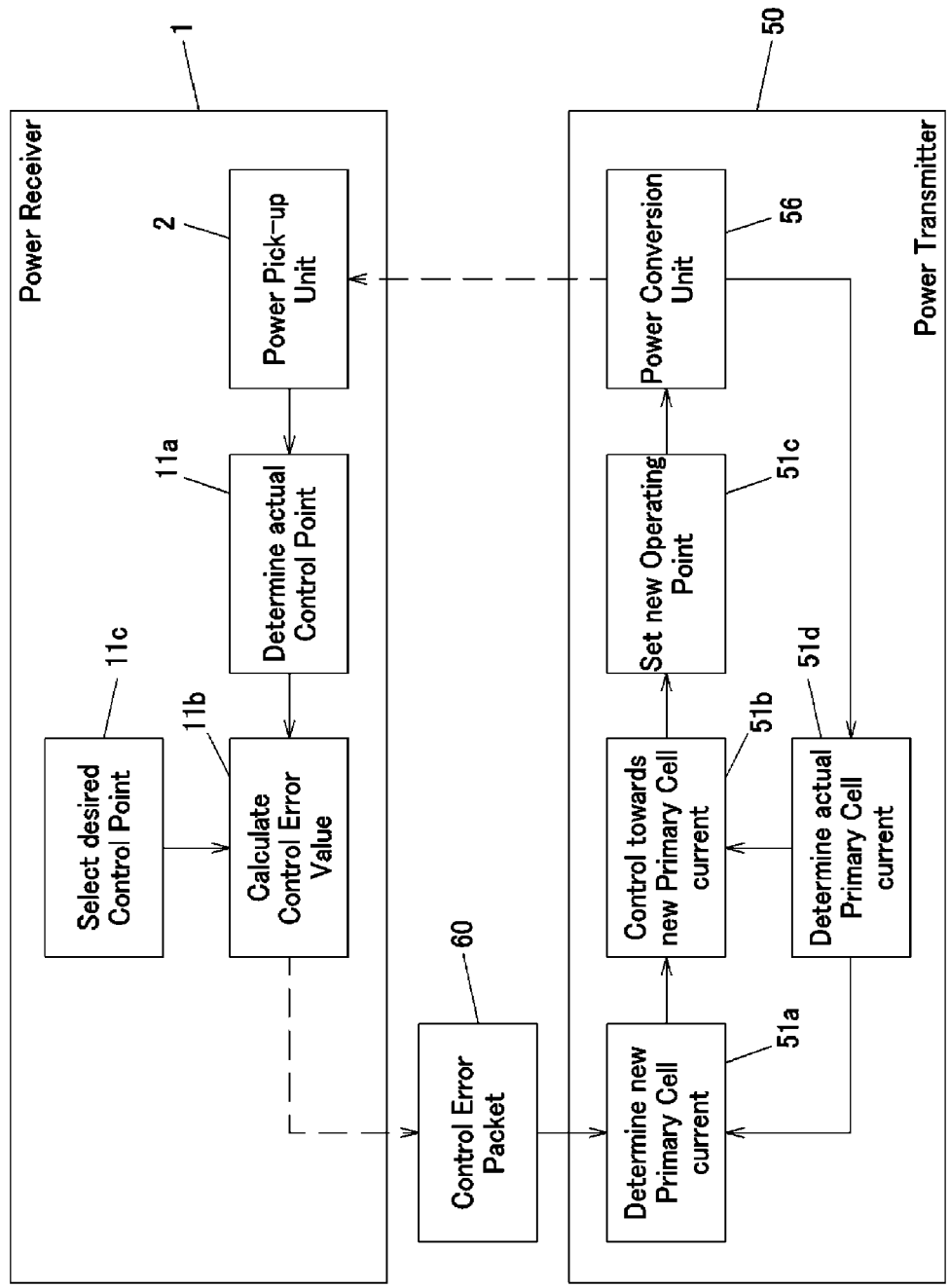
FIG. 5 is a block diagram illustrating a (Qi) standard-compliant control system of a contactless charging system.

FIG. 5 is a block diagram schematically illustrating a Qi-compliant contactless charging system. The contactless charging device (power transmitter) 50 on the primary side includes the convertor unit (power conversion unit) 56 configured to convert power from a commercial alternate current power source, a solar power output, or the like into a sine wave alternate current of approximately 100 kHz. The alternate current power resulting from the conversion is received by the transmission/reception unit (power pick-up unit) 2 including the secondary antenna in the power-receiving device (power receiver) 1. At this time, the power-receiving device 1 determines an actual control power value based on the actual received power (Determine actual Control Point 11a). The power-receiving device 1 sets in advance a desired power value necessary for the load (Select desired Control Point 11c), and calculates a difference between the desired power value point and the actual control value, thereby calculating a error value used for feedback control (Calculate Control Error Value 11b). The calculated error value is transmitted as feedback control data (control error packet 60) from the secondary antenna of the power-receiving device to the contactless charging device 50 through the primary antenna. Upon receiving the feedback control data 60, the contactless charging device 50 determines a new transmitted power (Determine new Primary Cell current 51a) based on the current transmitted power (Determine actual Primary Cell current 51d) so that the error value is zeroed. The above control operation is carried out so that the transmitted power and the control power value gradually get close to a target value. The operation procedure described above is performed intermittently and periodically.

If the aforementioned resonant frequency regulation process is additionally conducted in the middle of the above control operation procedure, the feedback operation may be affected, possibly leading to unstable operation of the contactless charging system. Furthermore, during transmission and reception of power with the determined transmitted power and control power value, the apparatus main unit might be engaged in operations other than charging of the secondary cell, and in this case, load power may change. In this situation, the resonant frequency cannot be regulated.

In view of the above, as illustrated in FIGS. 1 to 3, several operation modes are used for the power-receiving device 1 in at least one embodiment of the present disclosure. In the "power-receiving mode", which is one of the operation modes, charging or the like of the secondary cell is conducted as usual in accordance with standards such as Qi. In the "regulation mode, which is another operation mode, the power-receiving mode is terminated, and power transmitted from the contactless charging device 50 is set to be constant. Subsequently, while the constant power is being transmitted, the resonant frequency of the resonant circuit is regulated. In the regulation mode, the power-receiving device 1 sets the error value to be zero for the transmission of the constant power. When the error value is set to be zero, the contactless charging device 50 determines that the current transmitted power has reached the desired value, and accordingly, transmits a constant power to the power-receiving device 1.

In this state where the transmitted constant power is being received by the power-receiving device 1, the resonant frequency of the transmission/reception unit in the power-receiving device 1 is regulated by the method described with reference to FIG. 3.

Figure 6:
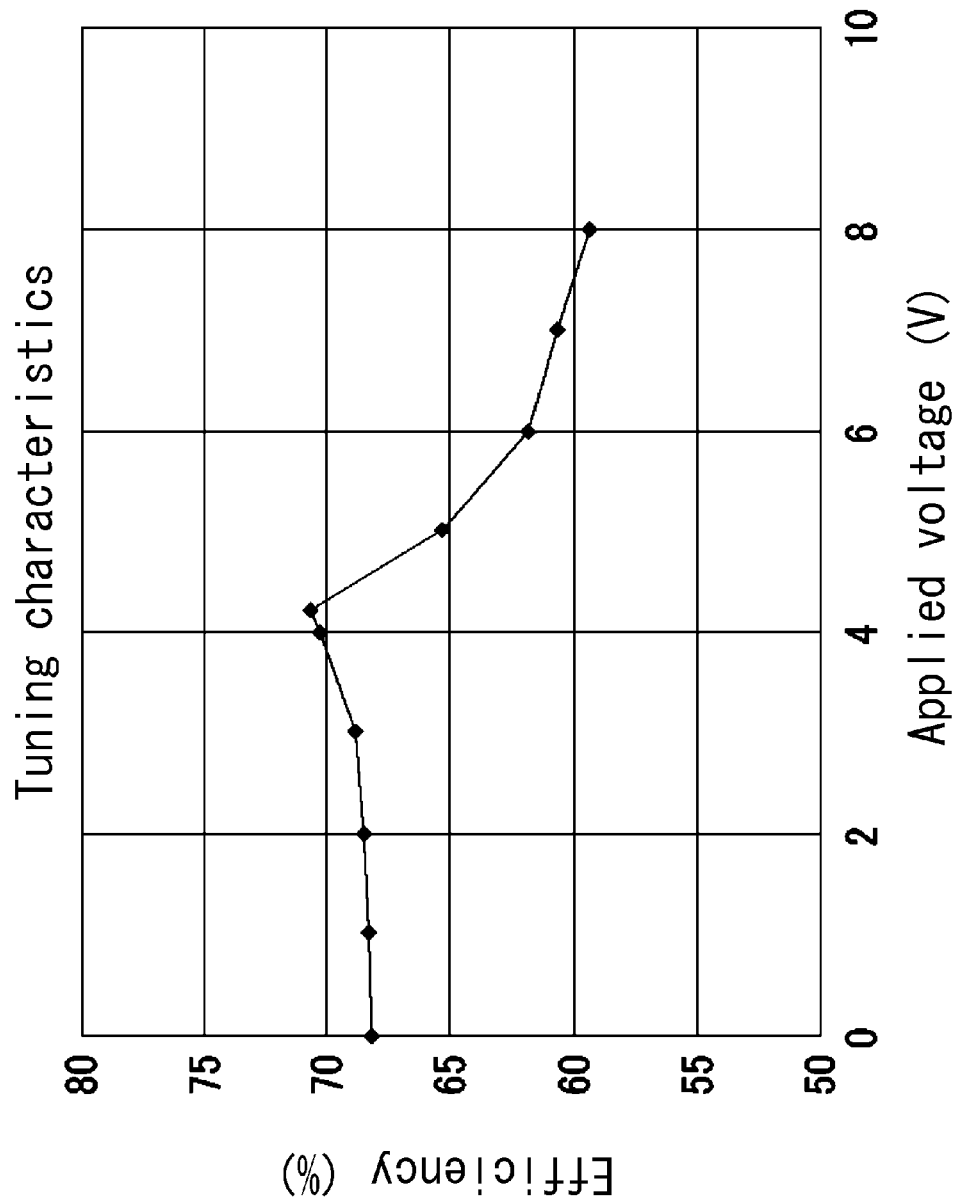
FIG. 6 is a graph illustrating exemplary direct current bias dependency of power transfer efficiency when the variable capacitance capacitor of FIG. 4 is used in a resonant circuit.

As illustrated in FIG. 6, under constant load condition, the resonant frequency is increased and transfer efficiency is improved in response the direct current bias voltage applied across ends of the capacitor included in the resonant circuit being gradually increased from 0 V. However, when the applied voltage exceeds around 4 V, an increase in the resonant frequency adversely decreases efficiency. In the presence of these efficiency characteristics, one only needs to control the power-receiving device 1 to generate voltage applied to the variable capacitance capacitor.

Since the resonant frequency changes depending on conditions such as an ambient temperature, the regulation mode is preferably set to be executed periodically. Upon each execution of the regulation mode, a voltage that is set to be gradually increased from 0 V is applied to the variable capacitance capacitor, and the voltage change is stopped once an amount of change in a received voltage or current exceeds a predetermined value. For example, in the power-receiving device 1 illustrated in FIG. 2, the DAC 3c in the system control unit 11 may be used to gradually increase the applied voltage from 0 V and to apply the voltage to the variable capacitance capacitor in the transmission/reception unit 2.

Examples of a method for peak detection in transfer efficiency includes, in addition to the above method, peak detection (Maximum Power Point Tracking: MPPT employed in solar power generation) by tracking the maximum voltage, and needless to say, any of the maximum voltage, the maximum current, and the maximum power may be tracked. Additionally, resonant frequency dependency of transfer efficiency varies depending on the design or the like of the device, and of course, power transfer efficiency may be optimized by acquiring power transfer efficiency characteristics to the resonant frequency and regulating it by a method suited for the characteristics.

2-3. Load Power Setting

The power-receiving device 1 not only controls charging of the secondary cell 6 but also supplies operating power to the apparatus main unit 30. Since power consumption of the apparatus main unit 30 changes depending on the state of operation, the power-receiving device 1 recognizes that load power changes. In the regulation mode, when such a change in load power due to the apparatus main unit 30 occurs while the constant power is being received, the resonant frequency cannot be regulated.

To address the above, a direct current supply to the apparatus main unit 30 is stopped while power supply to the apparatus main unit 30 is allowed through the secondary cell 6. The secondary cell 6 serves as a buffer for the change in load power of the apparatus main unit 30, and accordingly, the power-receiving device 1 only needs to supply a constant load power.

A description is given of a detailed configuration. As illustrated in FIG. 2, in the power-receiving mode, the SW 7a is connected to the diode 7c. By the two diode 7b and 7c, it is determined whether or not a charging voltage of the secondary cell 6 is greater than a service voltage of the apparatus main unit 30. When the charging voltage of the secondary cell 6 is greater than the service voltage of the apparatus main unit 30, the charge control unit 5 in the power-receiving device 1 charges the secondary cell 6, and the secondary cell 6 supplies power to the apparatus main unit 30. On the other hand, when the charging voltage of the secondary cell 6 is less than the service voltage of the apparatus main unit 30, the charge control unit 5 supplies power to the apparatus main unit 30 through the SW 7a and the diode 7c, and the power supply from the secondary cell 6 to the apparatus main unit 30 is stopped.

In the regulation mode, the SW 7a is opened to disconnect the path from the charge control unit 5 to the apparatus main unit 30 through the diode 7c. The above configuration enables the secondary cell 6 to supply power to the apparatus main unit 30 and accordingly, enables the power-receiving device 1 to supply a constant power solely to the secondary cell 6.

3. Received Power Regulation Method

Figure 7:
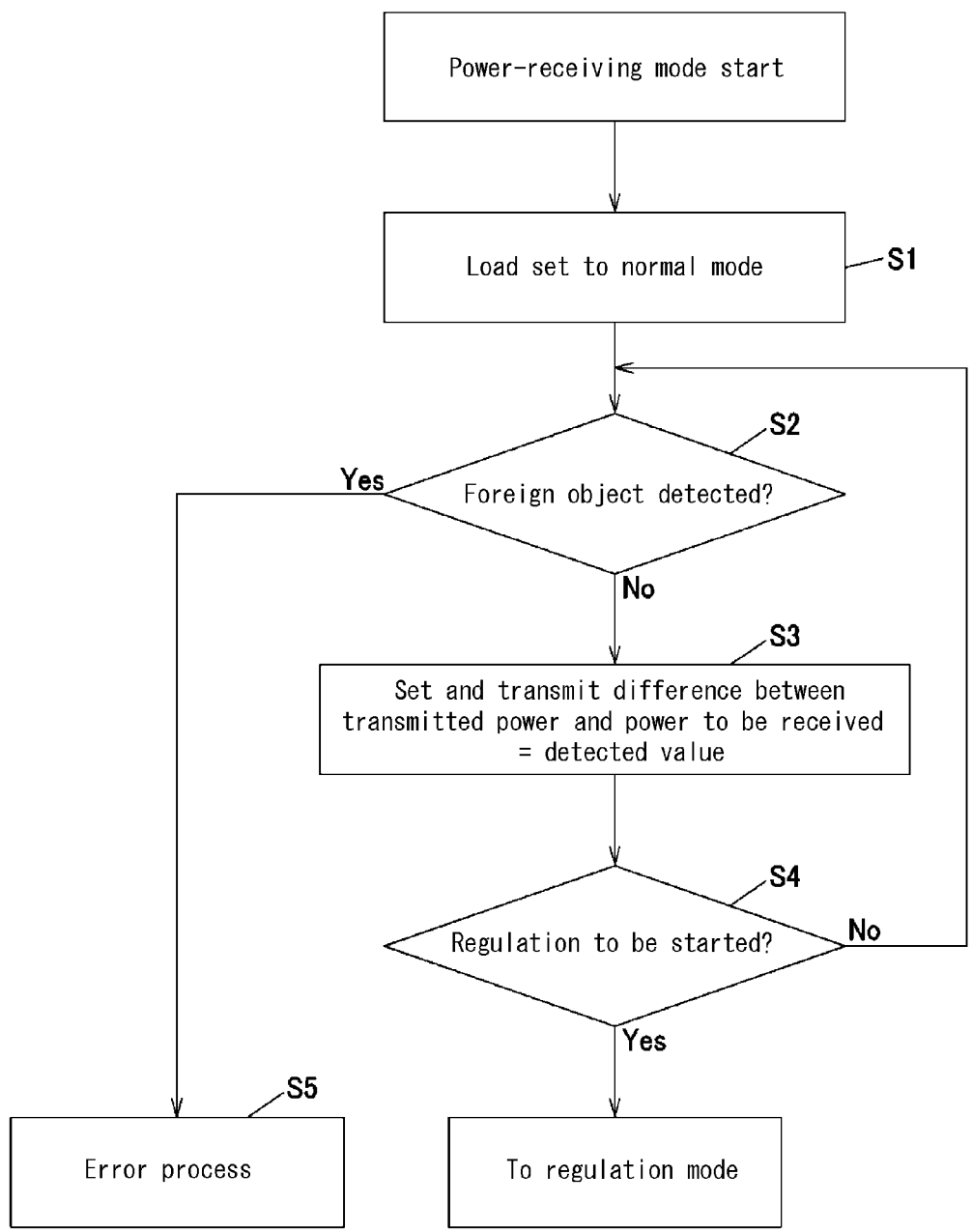
FIG. 7 is a flowchart for illustrating a received power regulation method according to at least one embodiment of the present disclosure, the flowchart focusing on a power-receiving mode in which a power-receiving device operates normally.

The following describes the operation procedure in detail with reference also to FIG. 2. FIG. 7 is a flowchart illustrating the operation procedure of the power-receiving device 1 in the power-receiving mode. As described above, the power-receiving mode is one of operation modes in which power is transmitted from the contactless charging device 50 and in which the transmitted power is regulated in accordance with the load state of the power-receiving device 1.

After the power-receiving mode is started, in Step S1, in accordance with an instruction from the charge control unit 5, the SW 7a is closed, so that the path is formed from the charge control unit 5 to the apparatus main unit 30 through the SW 7a and the diode 7c. When the charging voltage of the secondary cell 6 is less than the service voltage of the apparatus main unit 30, the charge control unit 5 controls the secondary cell 6 to be charged, and the apparatus main unit 30 receives a power supply directly from the charge control unit 5 through the diode 7c. When the voltage of the secondary cell 6 is greater than the service voltage of the apparatus main unit 30, the path on the SW 7a and the diode 7c is disconnected by the diode 7c, and the apparatus main unit 30 receives a power supply from the secondary cell 6.

In Step S2, the power-receiving device 1 detects a foreign object. The foreign object detection is to sense the presence of any metal other than the power-receiving device 1 or any non-compliant power-receiving device within the power transfer range of the contactless charging device 50. The presence of metal in the vicinity of the secondary antenna 2a of the power-receiving device 1 generates metal-induced eddy currents, and the eddy currents generate joule heat which heats metal. The loss will deteriorate power transfer efficiency and possibly pose a safety problem due to overheating. Accordingly, when power received by the power-receiving device 1 does not reach a predetermined value within a predetermined period, the power-receiving device 1 determines that a foreign object is present and performs exceptional processing such as stopping operation.

In the Qi standard, for example, the foreign object detection processing may employ the following method.

Firstly, it is determined whether or not the power-receiving device 1 is present by taking advantage of a difference in waveform of the current flowing through the primary antenna. When determining that the power-receiving device 1 is present, the contactless charging device 50 transmits, to the power-receiving device 1, a small power only sufficient to activate the power-receiving device 1. The activated power-receiving device 1 modulates Qi device validation data by the modulating unit 13 and transmits the modulated data to the contactless charging device 50 through the transmission/reception unit 2. The contactless charging device 50, when receiving predetermined device validation data from the power-receiving device 1, transitions to a normal power transmitting operation, and, when failing to receive the device validation data within a predetermined time period, determines that a foreign object has been detected and stops transmitting power.

In Step S2, when it is determined that a foreign object is not present (No), processing transitions to the normal operation, and when it is determined that a foreign object is present (Yes), processing moves to Step S5 for error process. Error process refers to, for example, the process performed by the power-receiving device 1 of stopping operation, and in this case, the system control unit 11 performs timeout processing.

In Step S3, the system control unit 11 calculates a difference between the transmitted power that has been actually received and the required power required by the load of the power-receiving device 1 and sets the calculated difference as a detected value (error value). The error value thus set is subjected to predetermined modulation by the modulating unit 13, and the modulated error value is transmitted to the contactless charging device 50 through the transmission/reception unit 2.

In Step S4, whether or not it is appropriate timing for switching to the regulation mode is determined. When it does not correspond to a period of the regulation mode, processing returns to Step S2 for the normal operation. When it is outside the period of the regulation mode, the normal operation is repeated. After a predetermined time period has elapsed, the power-receiving device 1 enters the regulation mode.

Figure 8:
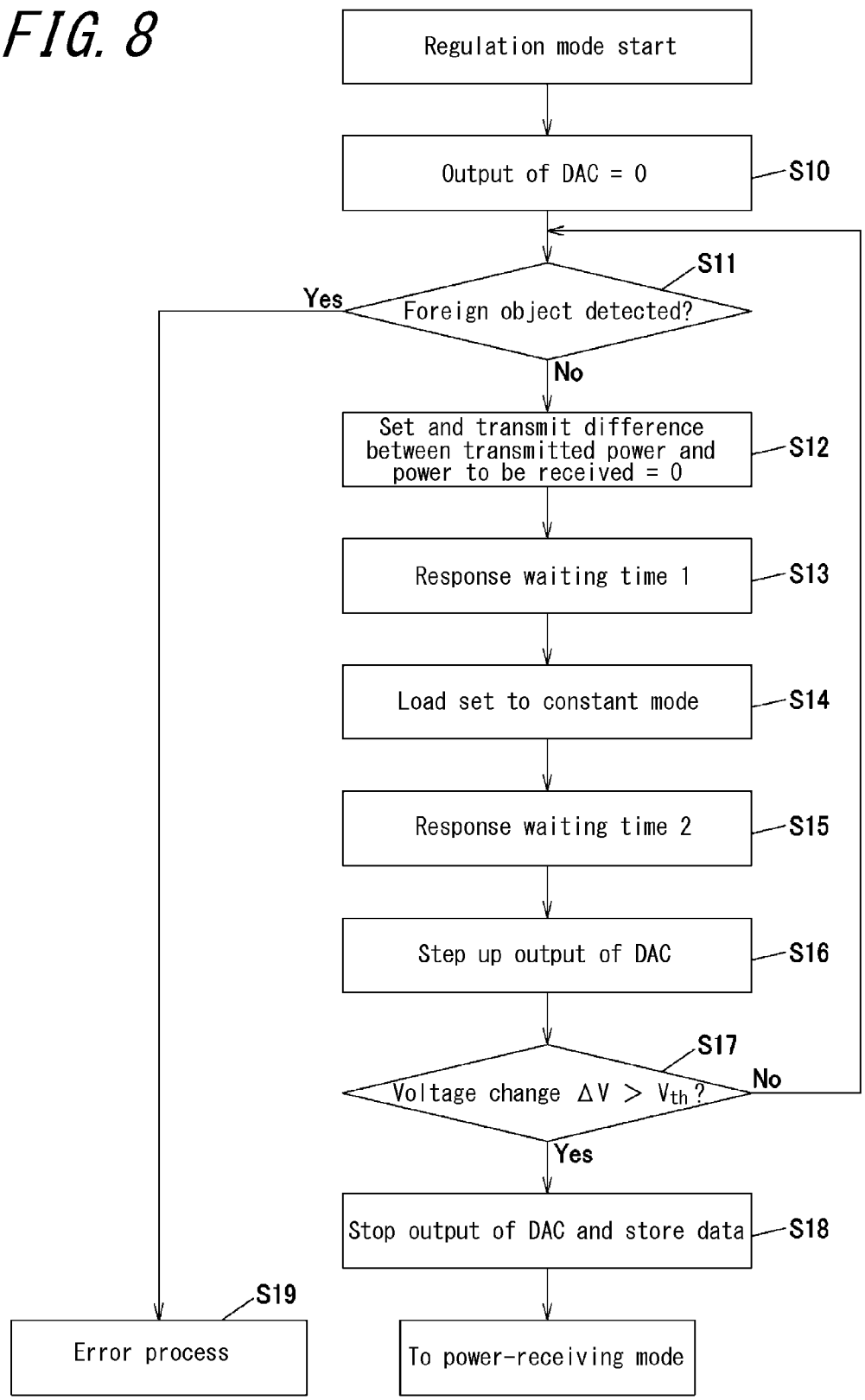
FIG. 8 is a flowchart for illustrating a received power regulation method according to at least one embodiment of the present disclosure, the flowchart focusing on a regulation mode in which a resonant frequency of a power-receiving device is regulated.

FIG. 8 is a flowchart illustrating the operation procedure of the power-receiving device 1 in the regulation mode. The regulation mode is one of operation modes in which power transmitted from the contactless charging device 50 and the load state of the power-receiving device 1 are maintained to be constant, and in which the received power is optimized by regulating the resonant frequency of the transmission/reception unit 2.

The period at which the power-receiving device 1 enters the regulation mode is set by the system control unit 11. For example, the period is specified by the program stored in the storage unit 3b. After the regulation mode is started, in Step S10, the system control unit 11 sets an output of the DAC 3c to be zero. The output of the DAC 3c forms control voltage for controlling the resonant frequency of the transmission/reception unit 2 through the reception control unit 15. As has been described with reference to FIG. 3, to control the resonant frequency by using the variable capacitance capacitor, the direct current bias voltage applied across ends of the variable capacitance capacitor needs to be set to be 0 V. Accordingly, the resonant frequency of the transmission/reception unit 2 is set to be the lowest value.

In Step S11, the power-receiving device 1 detects a foreign object. The foreign object detection is performed in the same way as in the power-receiving mode. When it is determined that a foreign object is present, processing moves to Step S19 for error process. When it is determined that a foreign object is not present, processing moves on to the following step.

In Step S12, the system control unit 11 sets the detected value (error value), which is a difference between the transmitted power that has been actually received and the required power required by the load of the power-receiving device 1, to be zero. The error value thus set to be zero is subjected to predetermined modulation by the modulating unit 13, and the modulated error value is transmitted to the contactless charging device 50 through the transmission/reception unit 2. Since the error value as a feedback amount is zero, the contactless charging device 50 determines that the load of the power-receiving device 1 has reached a predetermined desired value and transmits a constant power.

In Step S13, the system control unit 11 sets a response waiting time 1 for allowing a lapse of time till the contactless charging device 50 supplies the constant power and the power-receiving device 1 reaches a steady state.

After the response waiting time 1 has elapsed, in Step S14, the system control unit 11 instructs the charge control unit 5 to operate at a constant load. In accordance with the instruction, the charge control unit 5 opens the SW 7a to disconnect the pass from the charge control unit 5 to the apparatus main unit 30 through the SW 7a and the diode 7c. As a result, the apparatus main unit 30 receives a power supply from the secondary cell 6.

In Step S15, the system control unit 11 sets a response waiting time 2 for allowing a lapse of time till the load reaches the steady state.

In Step S16, the DAC 3c of the system control unit 11 steps up the control voltage of the resonant frequency by one unit. When an 8 bit DAC with a 5V reference voltage is used, the voltage may be stepped up by a unit of 4 mV/step. Of course, the precision of setting may be determined at will.

In Step S17, the system control unit 11 monitors a change $\Delta V$ in the received voltage before and after the change in output of the DAC, and Steps S11 through S16 are repeated until the change $\Delta V$ exceeds a predetermined threshold $V_{th}$. When the change $\Delta V$ does not reach the threshold $V_{th}$ within a predetermined time period, error process may be performed.

When the change $\Delta V$ in the received voltage exceeds the predetermined threshold $V_{th}$, in Step S18, the voltage is fixed to the output of the DAC 3c at this time.

In Step S18 described above, the power-receiving device 1 returns to the power-receiving mode again by assuming that the resonant frequency has been regulated and power transfer efficiency has been optimized.

The aforementioned flowcharts may be stored as programs in the storage unit 3b, and the system control unit 11 may perform processing in accordance with the steps. Furthermore, mixed signal techniques may be used to configure the entire control system unit 3, including the modulating and demodulating unit, into a single semiconductor circuit. Of course, any of the functional blocks may be selected for integration at will.

The aforementioned steps may be implemented by rewriting an existing program or by adding the steps thereto and stored in the storage unit 3b. Alternatively, the storage unit 3b loaded with the program may be additionally used. By doing so, the power-receiving device 1 according to at least one embodiment of the present disclosure is achieved without modifying an existing contactless power system.

4. Modifications

[Modification 1]

In the figures illustrating the following modifications, the same reference numerals are used to denote blocks having the same functions as in FIGS. 1 and 2 already described.

Figure 9:
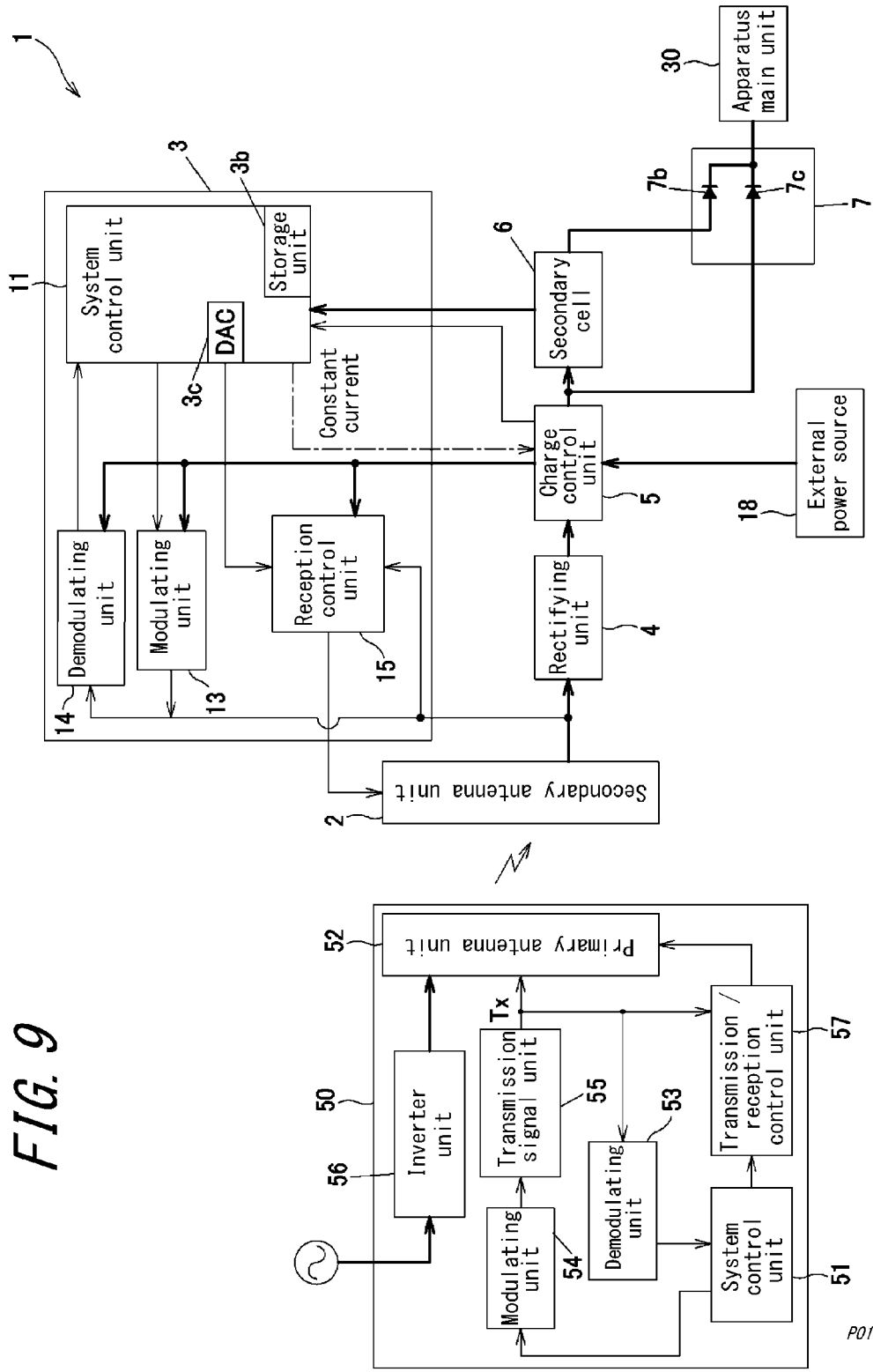
FIG. 9 is a block diagram illustrating an exemplary configuration of a power-receiving device according to a modification of the at least one embodiment of the present disclosure.

In the exemplary configuration illustrated in FIG. 2, the SW 7a is used to maintain the constant power in the regulation mode. However, depending on the type and operation of the apparatus main unit 30, operating power sometimes does not change greatly, and in this situation, the SW 7a may be omitted as illustrated in FIG. 9.

In detail, regardless of whether in the power-receiving mode or in the regulation mode, comparison between the charging voltage of the secondary cell 6 and the service voltage of the apparatus main unit 30 is made by the two diodes 7b, 7c. When the charging voltage of the secondary cell 6 is greater than the service voltage of the apparatus main unit 30, the charge control unit 5 of the power-receiving device 1 charges the secondary cell 6, while the apparatus main unit 30 receives a power supply from the secondary cell 6. On the other hand, when the charging voltage of the secondary cell 6 is less than the service voltage of the apparatus main unit 30, the charge control unit 5 supplies power to the apparatus main unit 30 through the SW 7a and the diode 7c, and the power supply from the secondary cell 6 to the apparatus main unit 30 is stopped.

In the present modification, similarly to the exemplary configuration illustrated in FIG. 2, in the regulation mode, the system control unit 11 instructs the charge control unit 5 to maintain load power to be constant.

[Modification 2]

Figure 10:
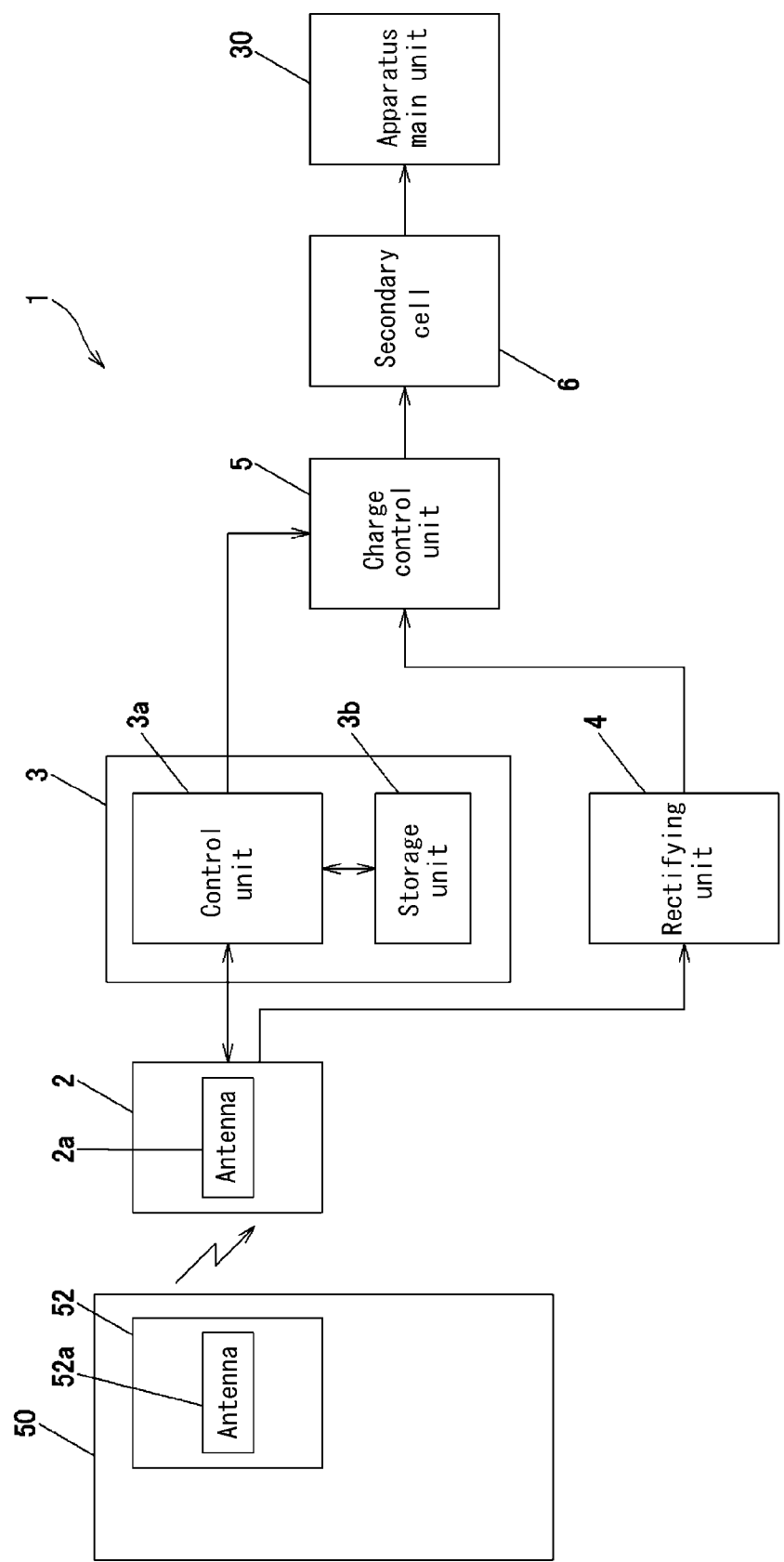
FIG. 10 is a block diagram illustrating an exemplary configuration of a power-receiving device according to another modification of the at least one embodiment of the present disclosure.

As illustrated in FIG. 10, the apparatus main unit 30 may also be configured to operate as a load of the secondary cell 6 to further simplify the configuration. This modification may be implemented as at least one embodiment according to the present disclosure, without the need for any change in hardware to an existing power-receiving device.

Figure 11:
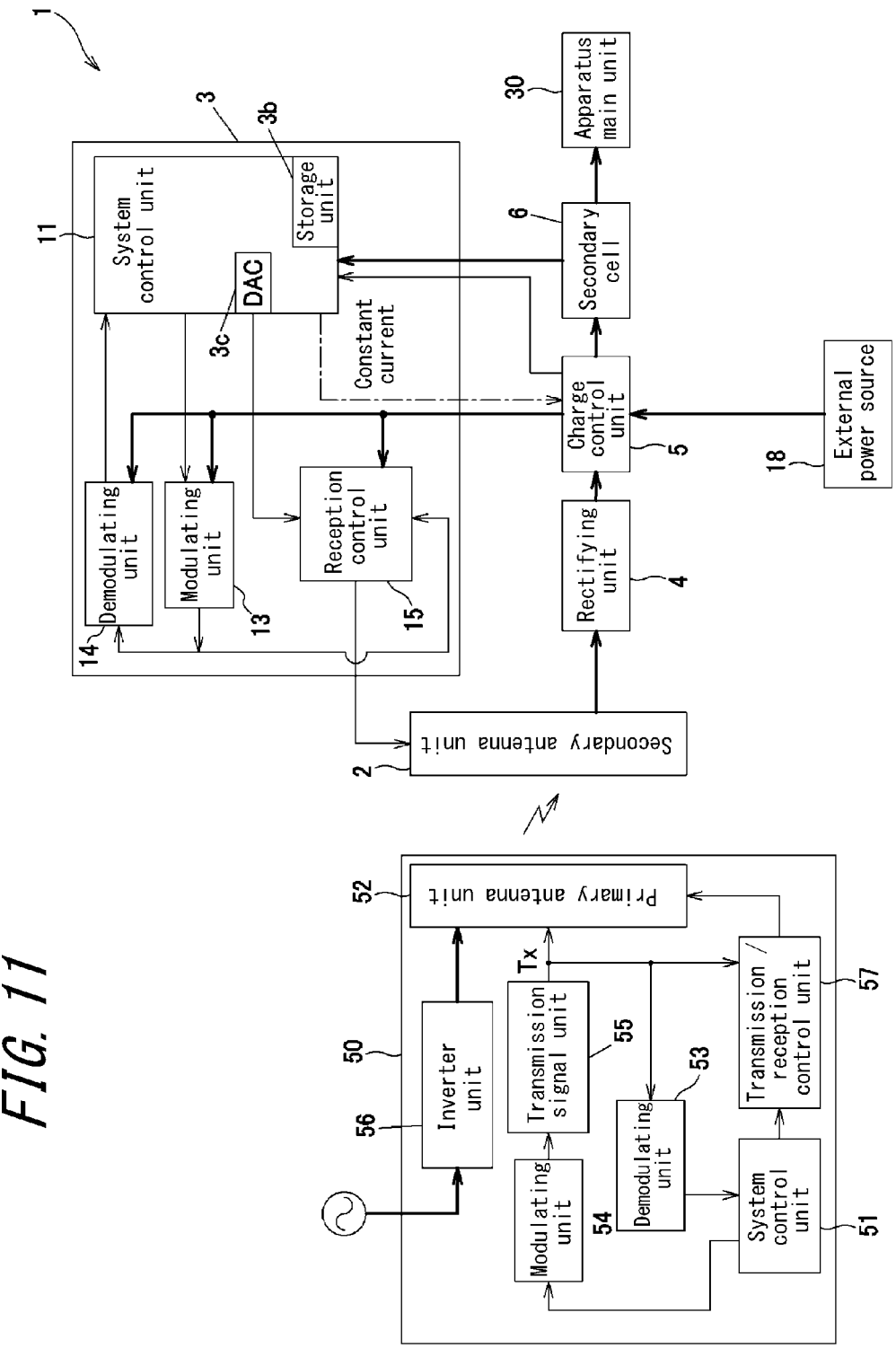
FIG. 11 is a block diagram illustrating further details of the exemplary configuration of FIG. 10.

As illustrated in FIG. 11, the charge control unit 5 controls the secondary cell 6 to be charged, and the apparatus main unit 30 is always operated by using the secondary cell 6 as the operating power source. In the regulation mode, the charge control unit 5 preferably operates in a constant load power mode in accordance with an instruction from the system control unit 11.

REFERENCE SIGNS LIST 1 power-receiving device
2 transmission/reception unit
2a secondary antenna
3 control system unit
3a control unit
3b storage unit
3c DAC unit
4 rectifying unit
5 charge control unit
6 secondary cell
7 charge SW unit
7a SW
7b, 7c diode
11 system control unit
13 modulating unit
14 demodulating unit
15 reception control unit
18 external power source
30 apparatus main unit
50 contactless charging device
51 system control unit
52 transmission/reception unit
52a primary antenna
53 demodulating unit
54 modulating unit
55 transmission signal unit
56 inverter unit
57 transmission/reception control unit
60 feedback control data

The invention claimed is:

1. A power-receiving device, comprising:
a transmission/reception unit including a resonant circuit having an antenna configured to receive a power transmitted from a contactless power transmitter and configured to transmit and receive data to and from the contactless charging device;
a charge control unit configured to perform power source control, including charging of a secondary cell, by using the power received by the transmission/reception unit; and
a control unit configured to generate control state data indicating a charging state of the secondary cell and/or a control state of a power source of an apparatus main unit operated with the secondary cell and configured to transmit the generated control state data to the contactless charging device through the transmission/reception unit, wherein
the control unit has:
a power-receiving mode in which the power transmitted based on the control state data is used for charging of the secondary cell through the charge control unit and/or for the power source of the apparatus main unit operated with the secondary cell; and
a regulation mode in which the received power is regulated by setting the control state data to a predetermined constant value and regulating a resonant frequency of the resonant circuit, and wherein
in the regulation mode, the control unit controls the charge control unit to supply a constant power to a load.

2. The power-receiving device of claim 1, wherein
in the regulation mode,
the control unit sets the resonant frequency to an initial value, measures received power data associated with the transmitted power, changes the resonant frequency by a predetermined value, measures the received power data corresponding to the changed resonant frequency until an amount of change in the received power data before and after the resonant frequency change reaches a predetermined threshold, and sets a frequency at which the amount of change has reached the threshold as the resonant frequency.

3. The power-receiving device of claim 2, wherein
the initial value of the resonant frequency is a lowest value within an available range of resonant frequencies, and the data includes a voltage value and/or a current value of a signal received by the transmission/reception unit.

4. The power-receiving device of claim 1, wherein
the regulation mode is executed periodically.

5. The power-receiving device of claim 4, wherein
a period to execute the regulation mode is greater than an inverse number of a response time for setting the regulation mode.

6. The power-receiving device of claim 1, wherein
the control state data includes a feedback amount determined based on a difference between the charging state of the secondary cell and/or the state of the power source of the apparatus main unit operated with the secondary cell, and a desired value thereof, and
in the regulation mode, the control unit sets the feedback amount to be zero.

7. The power-receiving device of claim 1, wherein
the charge control unit has a charging path used for charging the secondary cell and a power source path used for supplying the power source to the apparatus main unit directly by bypassing the charging path, the power source path being disconnected in the regulation mode.

8. The power-receiving device of claim 1, wherein
in the power-receiving mode and/or the regulation mode, operation of the power-receiving device is stopped when the control state data is greater than a predetermined threshold.

9. A received power regulation method of regulating a power received by a power-receiving device for contactless charging, the received power regulation method comprising: a power-receiving mode; and a regulation mode, wherein the power-receiving mode includes:

the step, performed by a transmission/reception unit, of receiving the power or data transmitted from a contactless charging device;

the step, performed by a charge control unit, of performing power source control, including charging of a secondary cell, by using the power received by the transmission/reception unit; and the step, performed by a control unit, of generating control state data indicating a charging state of the secondary cell and/or a control state of a power source of an apparatus main unit operated with the secondary cell, transmitting the generated control state data to the contactless charging device through the transmission/reception unit, and supplying a power transmitted based on the control state data to the secondary cell through the charge control unit and/or to the power source of the apparatus main unit operated with the secondary cell, and the regulation mode includes:

the step, performed by the control unit, of setting the control state data to a predetermined constant value, transmitting the control state data to the contactless charging device through the transmission/reception unit, and supplying a power transmitted based on the control state data to the secondary cell through the charge control unit and/or to the power source of the apparatus main unit operated with the secondary cell, wherein the control unit regulates the received power by regulating a resonant frequency of a resonant circuit included in the transmission/reception unit, and wherein the control unit controls the charge control unit to supply a constant power to a load.

10. The received power regulation method of claim 9, wherein the regulation mode further includes the steps, performed by the control unit, of:

setting the resonant frequency to an initial value and measuring received power data associated with the transmitted power;

changing the resonant frequency by a predetermined value and measuring the received power data corresponding to the changed resonant frequency until an amount of change in the received power data before and after the resonant frequency change reaches a predetermined threshold; and setting a frequency at which the amount of change has reached the threshold as the resonant frequency.

11. The received power regulation method of claim 10, wherein the initial value of the resonant frequency is a lowest value within an available range of resonant frequencies, and the data includes a voltage value and/or a current value of a signal received by the transmission/reception unit.

12. The received power regulation method of claim 9, wherein the regulation mode is executed periodically.

13. The received power regulation method of claim 12, wherein a period to execute the regulation mode is greater than an inverse number of a response time for setting the regulation mode.

14. The received power regulation method of claim 9, wherein the control state data includes a feedback amount determined based on a difference between the charging state of the secondary cell and/or the state of the power source of the apparatus main unit operated with the secondary cell, and a desired value thereof, and in the regulation mode, the control unit sets the feedback amount to be zero.

15. The received power regulation method of claim 9, wherein the charge control unit has a charging path used for charging the secondary cell and a power source path used for supplying the power source to the apparatus main unit directly by bypassing the charging path, the power source path being disconnected by the charge control unit in the regulation mode.

16. The received power regulation method of claim 9, wherein the power-receiving mode and/or the regulation mode further includes the step of detecting a metal substance other than the power-receiving device.

17. A semiconductor device comprising a storage unit storing a received power regulation program of a power-receiving device for contactless charging, a control unit configured to load and execute the received power regulation program, the received power regulation program comprising:

a power-receiving mode in which a power is received from a contactless charging device, the power-receiving mode including the step, performed by a transmission/reception unit, of receiving the power or data transmitted from the contactless charging device, the step, performed by a charge control unit, of performing power source control, including charging of a secondary cell, by using the power received by the transmission/reception unit, and the step, performed by the control unit, of generating control state data indicating a charging state of the secondary cell and/or a control state of a power source of an apparatus main unit operated with the secondary cell, transmitting the generated control state data to the contactless charging device through the transmission/reception unit, and supplying the power transmitted based on the control state data to the secondary cell through the charge control unit and/or to a power source for the apparatus main unit operated with the secondary cell; and a regulation mode in which the received power is regulated, the regulation mode including the step, performed by the control unit, of setting the control state data to a predetermined constant value, transmitting the control state data to the contactless charging device through the transmission/reception unit, and supplying a power transmitted based on the control state data to the secondary cell through the charge control unit and/or to the power source of the apparatus main unit operated with the secondary cell, wherein the control unit regulates the received power by regulating a resonant frequency of a resonant circuit included in the transmission/reception unit, and wherein the control unit controls the charge control unit to supply a constant power to a load.

* * * * *